INVENTOR.
JACK W. MONTOOTH

INVENTOR.
JACK W. MONTOOTH

United States Patent Office 3,265,333
Patented August 9, 1966

3,265,333
OVERRIDE CONTROL MEANS FOR AUTOMATIC LANDING SYSTEM
Jack W. Montooth, Long Beach, Calif., assignor to North American Aviation, Inc.
Filed Feb. 3, 1964, Ser. No. 341,875
11 Claims. (Cl. 244—77)

The subject invention relates to control means for overriding an automatic landing system, and more particularly to means for augmenting the effect of an automatic landing system upon a controlled vehicle's landing performance.

In the automatic landing control of an airborne vehicle, it is normally desired to effect an initial glide slope along a preselected or assigned glide path selected for considerations of air traffic control, the required glide slope or descent rate along the glide path being one for which positive aerodynamic control can be exercised over the airborne vehicle. However, the descent rate required at touchdown of the landing vehicle upon the runway is normally reduced to a lesser value to avoid damage to the craft at touchdown, but which is large enough to avoid "floating" (whereby a greater length of runway is required in which to positively land and stop the vehicle). The terminal maneuver in decreasing such descent rate is called a "flare-out maneuver," automatic means for performing the same being described in my co-pending patent application, Ser. No. 144,935, filed Oct. 13, 1961, and assigned to North American Aviation, Inc., assignee of the subject invention.

Because of the extremely critical nature of the flare-out and landing touchdown maneuver, a skilled human pilot is reluctant to rely entirely upon such automatic landing devices (e.g., to perform a so-called "hands-off" maneuver). Therefore, it is necessary to provide some form of over-ride controls whereby the pilot is free to either monitor or break-off the automatic landing maneuver.

Further, in an automatic landing system of the terminal prediction type described in the above-mentioned co-pending patent application, Ser. No. 144,935, filed Oct. 13, 1961, no provision is made for positive control of the range-distance required in order to effect a touchdown, only the time of touchdown and the terminal descent rate at touchdown being explicitly controlled. Any variations in ground-speed due to headwinds or tailwinds or to variations in airspeed will produce variations in the range-distance associated with the terminal control time within which the touchdown is performed.

In the attempt to override the above-described terminal prediction controller by means of the usual pilot's control stick, the automatic operation of the terminal prediction controller compensates for such attempt in the same manner as if the aircraft had been subjected to a gust or other flight-path disturbance. One means of reducing such compensation effect is to limit the control authority of the terminal prediction computer. However, such a scheme is not desirable because of the performance limitations thus placed upon the critical performance and usefulness of an automatic landing system.

Another scheme for effecting override control of an automatic landing system is to allow the pilot to disengage the system and perform the desired override maneuver and then re-engage the system. The disadvantages of such arrangement is that it may not be safe to re-engage the system, due to the introduction of unsafe transients, without the inclusion of ancillary signal-synchronizing equipment and special operating procedures. Further, even if the equipment could be safely re-engaged, there may not be enough time left in which to re-engage the system.

By means of the concept of the subject invention, override control of a terminal prediction landing controller is achieved by varying the time-to-go reference thereof.

In a preferred embodiment of the subject invention, there is provided a terminal prediction computer for landing control of an airborne vehicle. The computer comprises a time-to-go reference driven by a time-drive motor. There is provided means for regulating the speed of the time drive, and means cooperating with the first mentioned means for adjusting the speed of the motor.

By means of the above described arrangement, the time-to-go reference is varied, whereby the associated distance or range performance in effecting a landing is correspondingly varied without necessarily effecting, however, the touchdown rate-of-descent.

Accordingly, it is an object of the subject invention to provide override means for varying the time-to-go computation of a terminal prediction controller.

It is another object of the subject invention to provide means for overriding an automatic landing control system without disengaging the automatic landing control system.

It is a further object of the invention to provide means for overriding a terminal prediction landing system to vary the distance to touchdown without necessarily affecting the rate-of-descent at touchdown.

It is yet another object of the invention to provide means for overriding an automatic landing system without limiting the control authority of such landing system.

These and other objects of the subject invention will become clear from the following specification taken in conjunction with the accompanying drawings in which.

In the figures, like reference characters refer to like parts.

Figure 1:
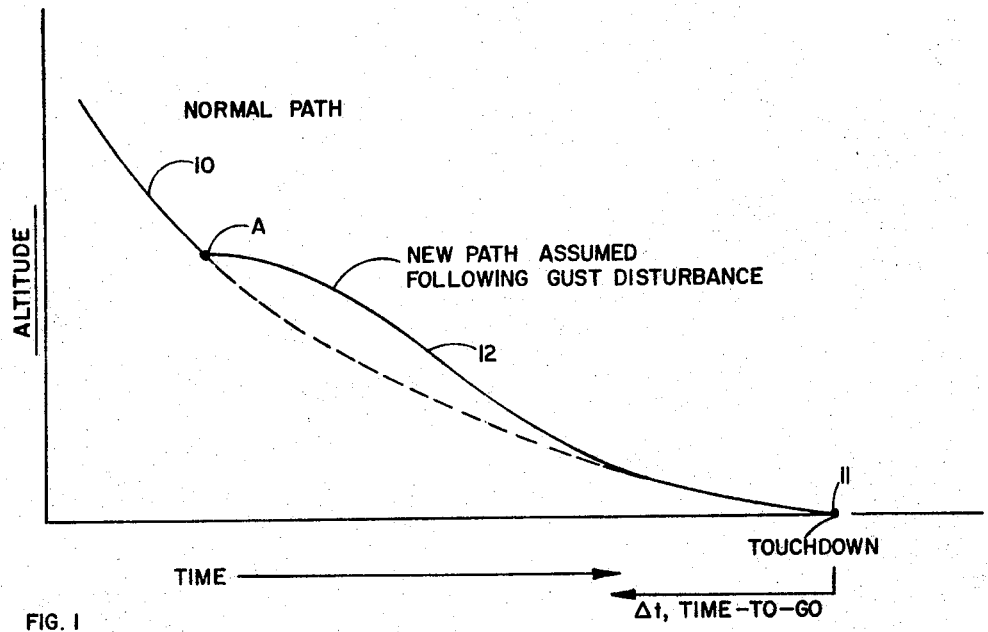
FIG. 1 is an exemplary time history of the response of a terminal prediction landing controller to a gust or other disturbance.

Referring now to FIG. 1, there is provided a time history of the altitude response of a terminal prediction aircraft landing system of the type described in the above mentioned co-pending patent application or in U.S. Patent No. 3,059,880, issued to E. R. Buxton. FIG. 1 illustrates an exemplary landing trajectory of altitude versus time, wherein an aircraft is controlled from an altitude at an initial descent rate along a nominal trajectory 12 to touchdown within a preselected time and at a preselected terminal or touchdown rate-of-descent. Where, at point A, a gust disturbance is experienced by the vehicle controlled by the system so as to cause the aircraft to deviate from the nominal path as indicated, a new landing path 14 is assumed which provides the same terminal conditions of touchdown time and terminal descent rate as path 12. Where the disturbance represents the pilot's attempt to provide an override input to the flight controller, the response of the terminal prediction computer is essentially the same.

Figure 2:
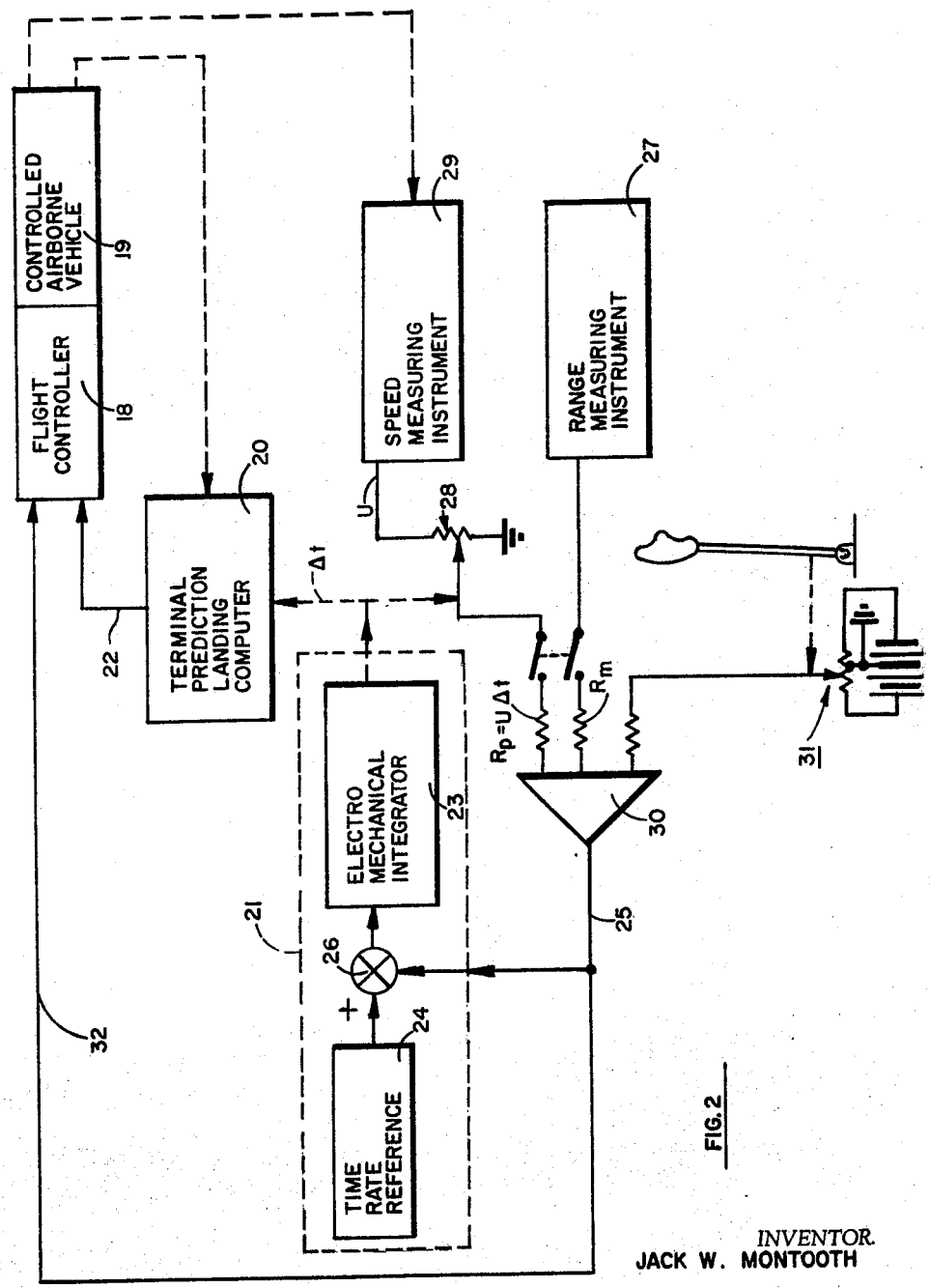
FIG. 2 is a functional block diagram of a flight control system employing the concept of the invention.

A terminal prediction landing system which, however, includes effective override control means is shown in FIG. 2.

Referring to FIG. 2, there is described a functional block diagram of a flight control system employing the concept of the invention. There is provided a pitch-control autopilot 18 in cooperation with an aircraft 19. The construction and arrangement of autopilot 18 and aircraft 19 are known to those skilled in the art and do not comprise a novel aspect of the invention. Accordingly, elements 18 and 19 are shown in block form only.

There is further provided a terminal prediction landing system comprising terminal prediction computer 20 driven by time-drive means 21 for providing landing control signals on line 22 to autopilot 18. The construction and arrangement of an exemplary embodiment of computer 20 is described in aforementioned U.S. Patent No. 3,059,880; therefore, element 20 is shown in block form only for convenience in exposition.

Time-drive means 21 is essentially a speed-regulated motor 23 or like integrating means for providing an output indicative of the time-to-go or time remaining between an elapsed interval of time and a selected interval of time, the speed of the motor being controlled relative to a reference source 24.

Cooperating with time-drive means 21 is signalling means providing a signal on line 25 for concomitantly adjusting the speed of time-drive 21 and providing a pitch maneuver reference signal input (on line 32) to autopilot 18, thereby altering the response of flight controller 18 to computer 20.

Such override signalling means may be comprised of a control stick position pickoff such as a potentiometer 31 for providing an override signal on line 25, which is fed as a command input signal to autopilot 18 for disturbing the flight path of vehicle 19. Alternatively, the control column may be connected to conventionally operate the primary flight controls of vehicle 19 in conjunction with the autopilot operation, as is well understood in the art.

In addition, the override signal on line 25 is combined with the reference signal from element 24 by signal combining means 26 for adjusting the speed of time-drive motor 23 in such sense as to reduce the tendency of computer 20 to compensate for, or resist, the effect of the previously described disturbance input fed to the vehicle flight controls, as will be more fully explained hereinafter. In this way, the pilot may vary the time-to-go performance of the system by superimposing a manual input to the system which (1) tends to disturb the controlled flight path of the vehicle 19 and (2) tends to produce a corresponding change in the speed of the time-drive means 21, hence changing the range-distance within which a landing is effected.

Alternatively, a range-control signal may be employed for providing an override control signal on line 25 indicative of the difference between a desired or measured range-to-go $R_m$ and a predicated range-to-go $R_p$. A signal indicative of the sensed range $R_m$ to a radar landing beacon, located at a preselected point on a landing strip or runway may be provided by an airborne radar 27 or like range-sensing means well-known in the art.

The predicted range-to-go or predicted forward distance $R_p$ that the aircraft will travel before touchdown is determined in the arrangement of FIG. 2 by the analog multiplication of time-to-go $\Delta t$ by vehicle forward velocity $U$. Such multiplication is effected by an auxiliary time-drive potentiometer 28 driven by time-drive motor 23 and excited by the electrical output of a speed sensor 29. Speed sensor 29 may be an airspeed sensor or doppler radar for providing a signal indicative of the forward velocity of the aircraft. Alternatively, sensor 29 might comprise a signal differentiator such as the tachometer of the range servo in radar 27 or other means for providing a signal indicative of the speed (or rate of change of sensed range, $U=dR_m/dt$) of vehicle 19.

The predicted range $R_p$ and sensed range $R_m$ are compared by means of a summing amplifier 30 or like means for summing the outputs of potentiometer 28 and range sensor 27, the outputs having mutually opposite senses or polarities. Hence, the output of summing means 30 provides an output indicative of the difference between a desired range-to-go $R_m$ and the predicted range $R_p$, for changing the landing distance or range performance of controlled vehicle 19.

Although the use of a manual override input signal (from potentiometer 31) and an automatic override signal (from the combined outputs from elements 27 and 28) have been discussed in the alternative, it is clear from the arrangement of FIG. 2 that such signals may be applied concurrently to summing amplifier 30 to provide a combined override signal. However, where the manual override input is applied only intermittently while the range error override input is applied continuously, the terminal time of touchdown will tend to be controlled by the range-error override input. An intermittent manual input will only temporarily change the speed of time-drive means 23, whereas the range error signalling means continuously controls the time-drive to an alternate terminal time reference. In other words, unless the control stick in FIG. 2 is maintained in a given override position, the range-error signalling means will tend to override the manual override input.

Figure 3:
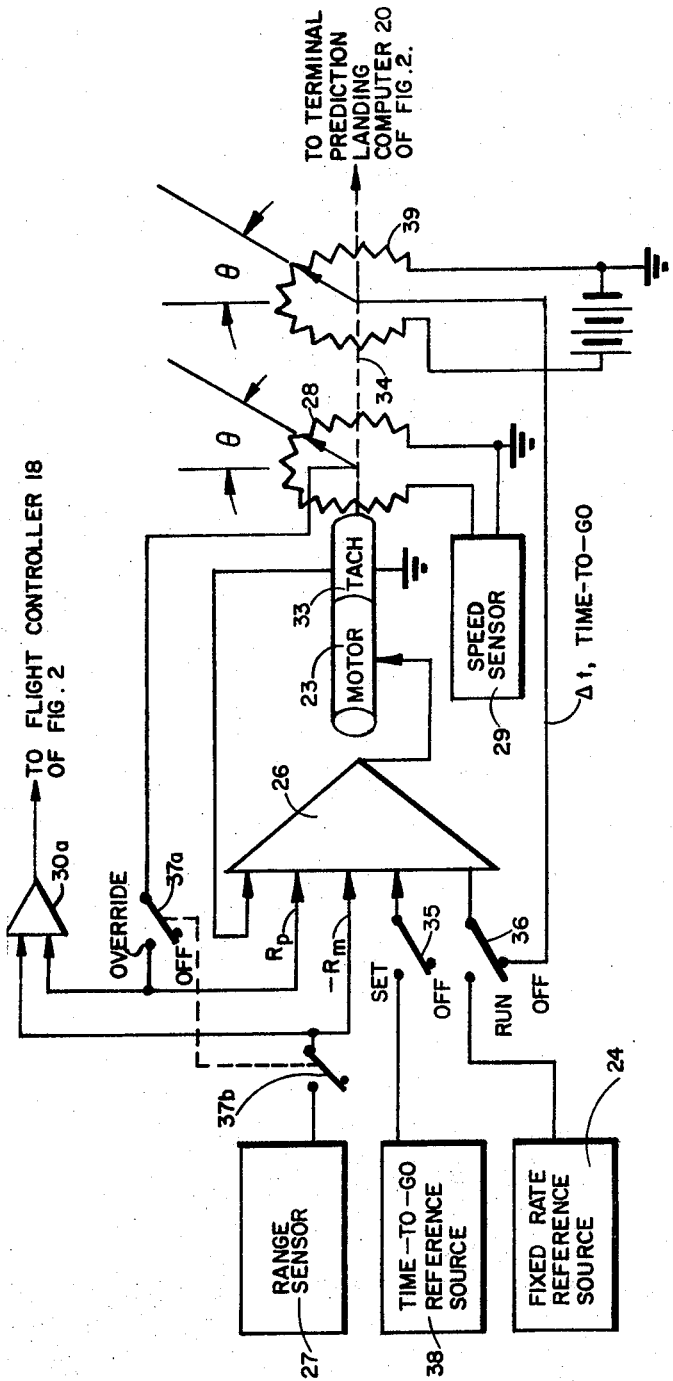
FIG. 3 is a diagram of one aspect of the invention, illustrating the cooperation thereof with the time drive means of FIG. 2.

An exemplary arrangement of the time-drive means 21 (of FIG. 2), including the cooperation of an override signal source, is shown in further detail in FIG. 3.

Referring to FIG. 3, there is illustrated a schematic diagram of one aspect of the invention, illustrating the cooperation thereof with the time drive means of FIG. 2. There is provided a closed-loop speed-regulated motor drive comprising a motor 23 responsively coupled to a summing amplifier 26, and a tachometer 33 operatively cooperating with shaft 34 of motor 23, an input of summing amplifier 26 being responsively connected to the output of tachometer 33.

A first, second and third switch 35, 36 and 37 are connected for providing additional inputs to summing amplifier 26. Prior to initiating a terminal prediction control phase, time-to-go reference signal source 38 is coupled to the input of amplifier 26 by means of first switch 35 to provide a signal indicative of a selected initial time-to-go in the operation of the system of FIG. 2. Double-throw switch 36 is operatively arranged to alternatively connect fixed rate reference 24 and the output from a shaft position pickoff potentiometer 39 to the input of amplifier 26.

Third double-pole switch 37 is operatively arranged to connect a source of an override control signal to the inputs of autopilot 18 (of FIG. 2) and summing amplifier 26. Such override signalling means may be comprised, for example, of a source 27 of a signal indicative of measured range $R_m$ and a source of a predicted range-to-go $(R_p=U\Delta t)$, comprising time-to-go potentiometer 28 mechanically driven by motor shaft 34 and electrically excited by forward speed signal source 29. The sense of the applied $R_m$ signal from sensor 27 is opposite that of rate reference source 24 and the sense of the applied $R_p$ signal from potentiometer 28 is of like sense as that of rate reference source 24, for reasons which will be more fully explained hereinafter.

A second summing amplifier 30a is responsively connected to the outputs of potentiometer 28 and range sensor 27 (by means of switches 37a and 37b respectively) to couple the override signal $(R_m-R_p)$ to an input of flight controller 18 (FIG. 2).

All the switches in FIG. 3 are shown in a disable position, such as when the device of FIG. 2 is not in direct use. In such condition, first and third switches 35 and 37 are open and second switch 36 is connected to negative position feedback potentiometer 39, as shown. Thus, the device of FIG. 3 acts as a position servo with a zero input reference, and output shaft 34 is servoed or maintained at an angular position corresponding to the implicit null signal reference.

In normal operation of the device of FIG. 3 as employed in the system of FIG. 2, first switch 35 is initially closed, thereby connecting the time-to-go reference 38 to the input of amplifier 26, in addition to the position feedback signal provided by second switch 36 from potentiometer 39. The arrangement of the device of FIG. 3 thus acts as a closed loop positional servo system, motor 23 operating to turn shaft 34 until the negative feedback signal from shaft position pickoff 39 equals (in magnitude) the positive bias signal from element 38. Hence, shaft 34 is positioned at an angular position $θ_T$ indicative of the time-to-go $Δt$. During such positioning of the shaft, the negative feedback rate signal acts to damp or stabilize the position feedback control loop action, as is well-understood in the servo control art.

When aircraft 19 (FIG. 2) is at a desired initial flight path position for commencing the flare-out and landing maneuver, first switch 35 is opened and second switch 36 is switched from its initial state to the RUN state, thereby disconnecting the position feedback loop and applying the output from rate reference signal source 24 to the input of amplifier 26. The sense of such fixed rate reference is opposite that of the position reference 38, whereby the position pickoff tends to be driven back to the zero position reference. The only feedback signal input to amplifier 26 is that from tachometer 33; therefore, motor 23 is operated as a fixed-rate or speed-regulated servo in rotating shaft 34 back through the angle $θ_T$ toward the null position.

Since the rate reference input from source 24 is fixed, the rate servo runs at a constant speed whereby the departure position of shaft 34 from the set position $θ_T$ is analogous to the passage of time. As the shaft continues to turn, it approaches that position corresponding to the electrical null of pickoff 39, indicating that the time-to-go $Δt$ is approaching zero, corresponding to the nominal touchdown point 11 of FIG. 1.

Figure 4:
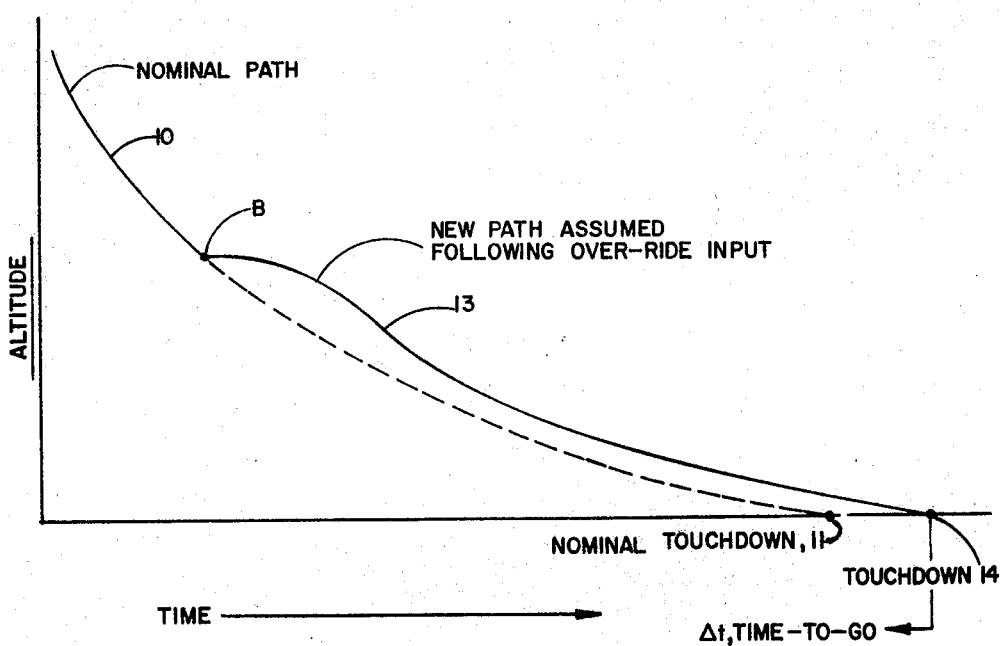
FIG. 4 is a time history of the response of the system of FIG. 2 to an overriding control input provided by means of the invention.

Where, however, an override input is combined with the input to amplifier 26 from fixed rate reference 24, the speed of motor 23 is made to vary, whereby the shaft position corresponding to zero time-to-go is approached either sooner or later, as determined by the sense of the override signal so combined, whereby the touchdown time of vehicle 19 (FIG. 2) in effecting a landing is changed, as is shown in FIG. 4.

Referring to FIG. 4, there is illustrated an exemplary time history of the response of the system of FIG. 2, to an override input provided by means of the concept of the invention. Curve 10 corresponds to the nominal descent path of FIG. 1, providing a nominal touchdown time at point 11 having a rate of descent indicated by the slope of such path. Where the system of FIG. 2 is disturbed by an externally applied force such as, for example, an atmospheric anomaly or gust (tending to increase the altitude of the vehicle), the response of the vehicle trajectory would be substantially that illustrated by curve 12 in FIG. 1, whereby the touchdown 11 point is substantially unaffected.

Where, however, the upward flight disturbance (as shown at point B in FIG. 4) is due to the application of an override signal of suitable sense to the pitch controller of vehicle 19 in FIG. 2, the concurrent application of such override signal to the summing amplifier 26 of FIG. 3 in such a sense as to oppose the fixed reference from source 24, causes the speed of servo motor 23 to slow down. Such decrease in the speed of servo motor 23 of FIG. 3 provides a delay or increase in the time required for shaft 38 to reach the zero time-to-go position, corresponding to the delay in the resultant touchdown point 14 (relative to the nominal touchdown point 11) illustrated in FIG. 4, from which delay a resultant increase is provided in the distance or range required within which to perform the touchdown. In other words, the concomitant application of the override signal to the time drive means 21 and the flight control 18 of FIG. 2 (by closing ganged switch 37a and 37b of FIG. 3) provides a cooperation therebetween for changing the range performance of the system of FIG. 2 without affecting the terminal rate of descent occurring at the time of touchdown. Also, the initial trajectory response to the override input provides a cue to the pilot of a sense corresponding to the effect upon the (future) terminal trajectory. Such immediate trajectory response thus satisfies the pilot's desire for a current manifestation of "what is going on" in accordance with his role of being "in command."

An increase in the range performance or time-to-go would be provided, for example, where the negative $R_m$ signal provided by range sensor 27 was greater in magnitude than the positive predicted range signal, $R_p = UΔt$. When the predicted range $R_p$ to touchdown is less than the range to a desired touchdown point, it is necessary to correspondingly increase the time-to-go of the landing maneuver. This is done by slowing the time drive motor by combining a negative override signal with the positive servo rate reference from element 24. Such negative signal in the embodiment of FIG. 3 is provided by the sum of the larger negative $R_m$ signal and the lesser positive $R_p$ signal. The resultant increase in the range-to-go performance is a function of the amount of the override signal and the duration of the applied signal (e.g., the time integral of the override signal).

Where the continuously measured range $R_m$ to the desired touchdown point is less than the predicted range $R_p$ to the touchdown point corresponding to the terminal control touchdown time, then a positive-polarity override signal would obtain, resulting in speeding up the time-drive motor so as to advance the touchdown time relative to point 11 (in FIG. 4), whereby the range performance in effecting a landing is shortened to comply with the lesser range performance desired.

Hence, it is to be appreciated that improved control means have been described for providing override control of a terminal prediction landing system without requiring either disengagement, or limitation in the control authority, of such landing system.

Although the invention has been illustrated and described in detail, it is to be clearly understood that the same is by way of illustration and example only and is not to be taken by way of limitation, the spirit and scope of this invention being limited only by the terms of the appended claims.

I claim:
1. In a terminal prediction computer for an aerospace vehicle, said computer having integrator means for generating a time-to-go signal, integrator rate biasing means for modifying said time-to-go signal in response to an override signal and the length of time such signal persists.

2. In a terminal prediction computer having a time-to-go reference driven by an integrator
rate biasing means regulating the input to said integrator, and
adjustable signalling means cooperating with said first mentioned means for adjusting the input to said integrator,
whereby said time-to-go reference may be varied.

3. In a terminal prediction computer having a time-to-go reference driven by a time-drive motor,
means regulating the speed of said motor, and
adjustable signalling means cooperating with said first mentioned means for adjusting the speed of said motor,
whereby said time-to-go reference may be varied.

4. In a terminal prediction computer having a time-to-go reference driven by a time-drive motor,
means regulating the speed of said motor, and
manually controlled signalling means cooperating with said first mentioned means for adjusting the speed of the motor,
whereby said time-to-go reference may be varied.

5. In a terminal prediction computer
a time-to-go potentiometer driven by a time-drive motor and providing a terminal prediction time reference,
means for regulating the speed of said time-drive motor, and
manually-controllable means cooperating with said first mentioned means to vary the terminal prediction time reference provided by said potentiometer.

6. In a terminal prediction computer for landing control of an airborne vehicle,
a time-to-go reference driven by a time-drive motor,
means for regulating the speed of said time-drive motor, and
manually-controllable means cooperating with said first mentioned means to vary the terminal prediction time provided by said reference.

7. In a terminal prediction computer having a time-to-go reference driven by a time-drive motor for landing control of an airborne vehicle,
means regulating the speed of said motor, and
means cooperating with said first mentioned means for adjusting the speed of said motor.

8. The device of claim 7 in which said second mentioned means comprises:
range sensing means for determining the range of said vehicle relative to a landing touchdown reference,
velocity sensing means for determining the velocity of said vehicle,
range-prediction means responsive to said time-to-go reference and said velocity sensor for providing a predicted range signal indicative of the product of said sensed velocity and time-to-go, and
signal comparison means responsive to said sensed range and said predicted range for providing a signal indicative of the difference therebetween, said signal comparison means cooperating with said regulating means to adjust said time-to-go in accordance with the sense of said difference.

9. In a terminal prediction control device for landing control of an airborne vehicle
a summing amplifier,
a time-drive motor responsively connected to said summing amplifier, and having a feedback tachometer, providing an electrical output,
velocity sensing means for providing an electrical signal indicative of the forward velocity of said vehicle,
a time-to-go potentiometer coupled to be mechanically driven by said motor and electrically excited by said velocity sensor for providing a predicted range-to-go signal,
range-sensing means for providing an electrical signal indicative of the range of said vehicle to a landing touchdown reference, and
a source of a motor speed reference signal,
said summing amplifier being responsive to said tachometer, said motor speed reference, said predicted range and said range-sensing signals,
said speed reference and said range signals being of like sense, and
said tachometer and predicted range signals being of a sense opposed to that of said speed reference and range signals.

10. In a landing control system for controlling the terminal touchdown time and terminal descent rate of a controlled vehicle, the combination comprising
a flight controller for pitch control of said controlled vehicle,
a terminal prediction computer for providing flight control inputs to said flight controller,
time-integrating means for driving said computer,
rate biasing means for regulating the input to said time-integrating means, and
adjustable signalling means for providing an override signal to said flight controller and said regulating means.

11. In an aircraft, landing control means for controlling the terminal touchdown and terminal descent rate of said aircraft comprising
a flight controller for pitch control of said controlled vehicle,
a terminal prediction computer for providing flight control inputs to said flight controller,
a first summing amplifier,
a time-drive motor responsively connected to said first summing amplifier for driving said terminal prediction computer,
a feedback tachometer driven by said time-drive motor and providing an electrical output signal,
velocity sensing means for providing an electrical signal indicative of the forward velocity of said vehicle,
a time-to-go potentiometer coupled to be mechanically driven by said motor and electrically excited by said velocity sensor for providing a predicted range-to-go signal,
range-sensing means for providing an electrical signal indicative of the range of said vehicle to a landing touchdown reference,
a source of a motor speed reference signal, and
a second summing amplifier responsive to said time-to-go potentiometer and said range-sensing means for providing an override input to said flight controller,
said first summing amplifier being responsive to said tachometer, said motor speed reference, said predicted range and said range-sensing signals,
said speed reference and said range signals being of like sense, and said tachometer and predicted range signals being of a sense opposed to that of said speed reference and range signals.

References Cited by the Examiner
UNITED STATES PATENTS 3,169,730  2/1965  Gaylor et al. _____ 244—77
3,177,348  4/1965  Daniloff _____ 235—150.23

FERGUS S. MIDDLETON, *Primary Examiner.*